United States Patent
Okuyama

(10) Patent No.: US 7,295,885 B2
(45) Date of Patent: Nov. 13, 2007

(54) MULTI-EXPOSURE DRAWING METHOD AND APPARATUS THEREOF FOR DIVIDING AN EXPOSING AREA INTO EXPOSED ZONES AND UN-EXPOSED ZONES BASED ON ODD-NUMBERED AND EVEN-NUMBERED VECTOR-GRAPHIC DATA

(75) Inventor: Takashi Okuyama, Saitama (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 112 days.

(21) Appl. No.: 10/933,307

(22) Filed: Sep. 3, 2004

(65) Prior Publication Data

US 2005/0052464 A1     Mar. 10, 2005

(30) Foreign Application Priority Data

Sep. 5, 2003    (JP)    ............................ P2003-313934

(51) Int. Cl.
*G06F 19/00*    (2006.01)
*G21K 5/10*    (2006.01)

(52) U.S. Cl. .................... 700/121; 716/21; 250/492.22
(58) Field of Classification Search ................ 700/121
See application file for complete search history.

(56) References Cited

U.S. PATENT DOCUMENTS

| | | | |
|---|---|---|---|
| 5,980,088 A | 11/1999 | Iwasaki et al. | ............. 700/166 |
| 6,100,915 A | 8/2000 | Iwasaki et al. | ............. 347/249 |
| 6,159,644 A * | 12/2000 | Satoh et al. | .................. 430/22 |
| 6,886,154 B2 * | 4/2005 | Okuyama | ..................... 716/21 |
| 7,039,487 B2 * | 5/2006 | Nagata et al. | .............. 700/121 |
| 2003/0001798 A1 | 1/2003 | Okuyama | ..................... 345/30 |
| 2003/0011860 A1 | 1/2003 | Okuyama | .................. 359/196 |
| 2003/0031365 A1 * | 2/2003 | Okuyama | .................. 382/194 |

FOREIGN PATENT DOCUMENTS

JP    2003-57836    2/2003

OTHER PUBLICATIONS

English Language Abstract of JP 2003-57836.
U.S. Appl. No. 10/933,306 to Miyoshi et al., which was filed on Sep. 3, 2004.

* cited by examiner

*Primary Examiner*—Ryan A. Jarrett
(74) *Attorney, Agent, or Firm*—Greenblum & Bernstein, P.L.C.

(57) ABSTRACT

In a drawing method, all information on a pattern to be drawn on a drawing surface, represented by first vector-graphic data of a drawing-coordinate-system, is transmitted to an exposure drawing apparatus having a plurality of optical modulation elements. The first vector-graphic data is converted to second vector-graphic data of an exposing-coordinate-system that conforms to the exposure drawing apparatus, and the second vector-graphic data is converted to raster-graphic data of the exposing-coordinate-system. Finally, the drawing surface is multi-exposed for drawing the pattern, based on the raster-graphic data to control the exposure by the optical modulation elements.

10 Claims, 9 Drawing Sheets

FIG. 9

| | ⋮ | ⋮ | ⋮ | ⋮ | ⋮ | ⋮ | ⋮ | ⋮ | ⋮ | |
|---|---|---|---|---|---|---|---|---|---|---|
| 7 | 0 | 0 | 0 | 0 | 0 | 0 | 1 | 0 | ·· |
| 6 | 0 | 0 | 0 | 1 | 1 | 1 | 1 | 0 | ·· |
| 5 | 0 | 1 | 1 | 1 | 1 | 1 | 1 | 0 | ·· |
| 4 | 0 | 1 | 1 | 1 | 1 | 1 | 1 | 1 | ·· |
| 3 | 0 | 0 | 1 | 1 | 1 | 1 | 1 | 0 | ·· |
| 2 | 0 | 0 | 1 | 1 | 0 | 0 | 0 | 0 | ·· |
| 1 | 0 | 0 | 0 | 0 | 0 | 0 | 0 | 0 | ·· |
| 0 | 0 | 0 | 0 | 0 | 0 | 0 | 0 | 0 | ·· |
| | 0 | 1 | 2 | 3 | 4 | 5 | 6 | 7 | ·· |

Y' COORDINATE

X' COORDINATE

US 7,295,885 B2

MULTI-EXPOSURE DRAWING METHOD AND APPARATUS THEREOF FOR DIVIDING AN EXPOSING AREA INTO EXPOSED ZONES AND UN-EXPOSED ZONES BASED ON ODD-NUMBERED AND EVEN-NUMBERED VECTOR-GRAPHIC DATA

BACKGROUND OF THE INVENTION

1. Field of the Invention

The present invention relates to a drawing method for drawing a pattern on a surface of a workpiece, using an exposure drawing apparatus including a plurality of optical modulation elements, and also relates to an exposure drawing apparatus in which the drawing method is executed.

2. Description of the Related Art

Conventionally, a drawing apparatus is used for optically drawing fine patterns and symbols such as characters on the surface of a workpiece. A representative use of the drawing apparatus is for drawing a circuit pattern on a workpiece when a printed circuit board is manufactured using photolithography. In this case, the workpiece may be either a photosensitive film for producing a photomask or a photoresist layer formed on a suitable substrate.

In the conventional drawing apparatus, the image (raster-graphic data) to be exposed on the workpiece, is produced based on vector-graphic data (circuit data) transmitted from a computer using CAD and such like. In this type of drawing method, the drawing resolution is limited by the number of pixels supported with the apparatus. Further, the data-conversion load and data-transmittance load can be heavy because the amount of data must be increased to improve resolution.

SUMMARY OF THE INVENTION

Therefore, an objective of the present invention is to provide a drawing method for a multi-exposure drawing apparatus, to achieve a high-resolution drawing without having a heavy data-conversion load and data-transmittance load.

Another objective of the present invention is to provide a multi-exposure drawing apparatus in which the aforesaid multi-exposure drawing method is executed.

A drawing method for drawing a pattern according to the present invention, includes a transmitting step in which all information on the pattern to be drawn on a drawing surface, represented by first vector-graphic data of a drawing-coordinate-system, is transmitted to an exposure drawing apparatus having a plurality of optical modulation elements. The method also includes a first converting step, a second converting step, and a multi-exposing step. In the first converting step, the first vector-graphic data is converted to second vector-graphic data of an exposing-coordinate-system that conforms to the exposure drawing apparatus. In the second converting step, the second vector-graphic data is converted to raster-graphic data of the exposing-coordinate-system, to control the exposure by the optical modulation elements. And in the multi-exposing step, a drawing surface is multi-exposed for drawing the pattern, based on the raster-graphic data.

The drawing method for drawing a pattern according to the present invention, may include an extracting step. In the extracting step, part of the second vector-graphic data is extracted, between the first converting step and the second converting step. In the second converting step, the extracted second vector-graphic data is converted to the raster-graphic data. Then, the extracting step, the second converting step, and the multi-exposing step are repeated.

In the drawing method, the first vector-graphic data may contain information to determine a method for converting the second vector-graphic data to the raster-graphic data. In the second converting step, the second vector-graphic data may be put in order and assigned a number according to the coordinate system value of each of the second vector-graphic data. And all of the second vector-graphic data may be divided into odd-numbered vector-graphic data and even-numbered vector-graphic data based on each number of the second vector-graphic data. The second vector-graphic data may be converted to the raster-graphic data by dividing an exposing area, which is an exposable area in the exposing-coordinate-system, into exposed zones and un-exposed zones based on the odd-numbered vector-graphic data and the even-numbered vector-graphic data.

In the second converting step, smaller numbers can be assigned to the second vector-graphic data having smaller coordinate system values, and the coordinate axes of the exposing-coordinate-system can be included in the even-numbered vector-graphic data. A zone between one even-numbered vector-graphic data and one odd-numbered vector-graphic data having an assigned number 1 more than that of the even-numbered vector-graphic data, can be set as an un-exposed zone, and a zone between one odd-numbered vector-graphic data and one even-numbered vector-graphic data having an assigned number 1 more than that of the odd-numbered vector-graphic data, can be set as an exposed zone.

In accordance with another aspect of the present invention, there is provided a multi-exposure drawing apparatus that has an exposure unit that includes a plurality of optical modulation elements. The apparatus comprises a receiver that receives all information on a pattern to be drawn on a drawing surface, as first vector-graphic data of a drawing-coordinate-system, a first converter that converts the first vector-graphic data to second vector-graphic data of an exposing-coordinate-system, and a second converter that converts the second vector-graphic data to raster-graphic data of the exposing-coordinate-system. The apparatus also comprises a modulation system that operates the exposure unit to draw a pattern based on the raster-graphic data.

The multi-exposure drawing apparatus according to the present invention, may further comprise an extractor that extracts part of the second vector-graphic data, and a second converter that converts the extracted second vector-graphic data to raster-graphic data. And the modulation system operates the exposure unit based on the raster-graphic data converted from the extracted second vector-graphic data, and the extraction, the second conversion, and the modulation based on part of the raster-graphic data, are repeated.

The multi-exposure drawing apparatus according to the present invention, may have optical modulation elements arranged in a two-dimensional arrangement.

BRIEF DESCRIPTION OF THE DRAWINGS

The present invention will be better understood from the description of the preferred embodiment of the invention set forth below together with the accompanying drawings, in which:

FIG. 9 is a conceptual view of raster-graphic data.

DESCRIPTION OF THE PREFERRED EMBODIMENTS

Figure 1:
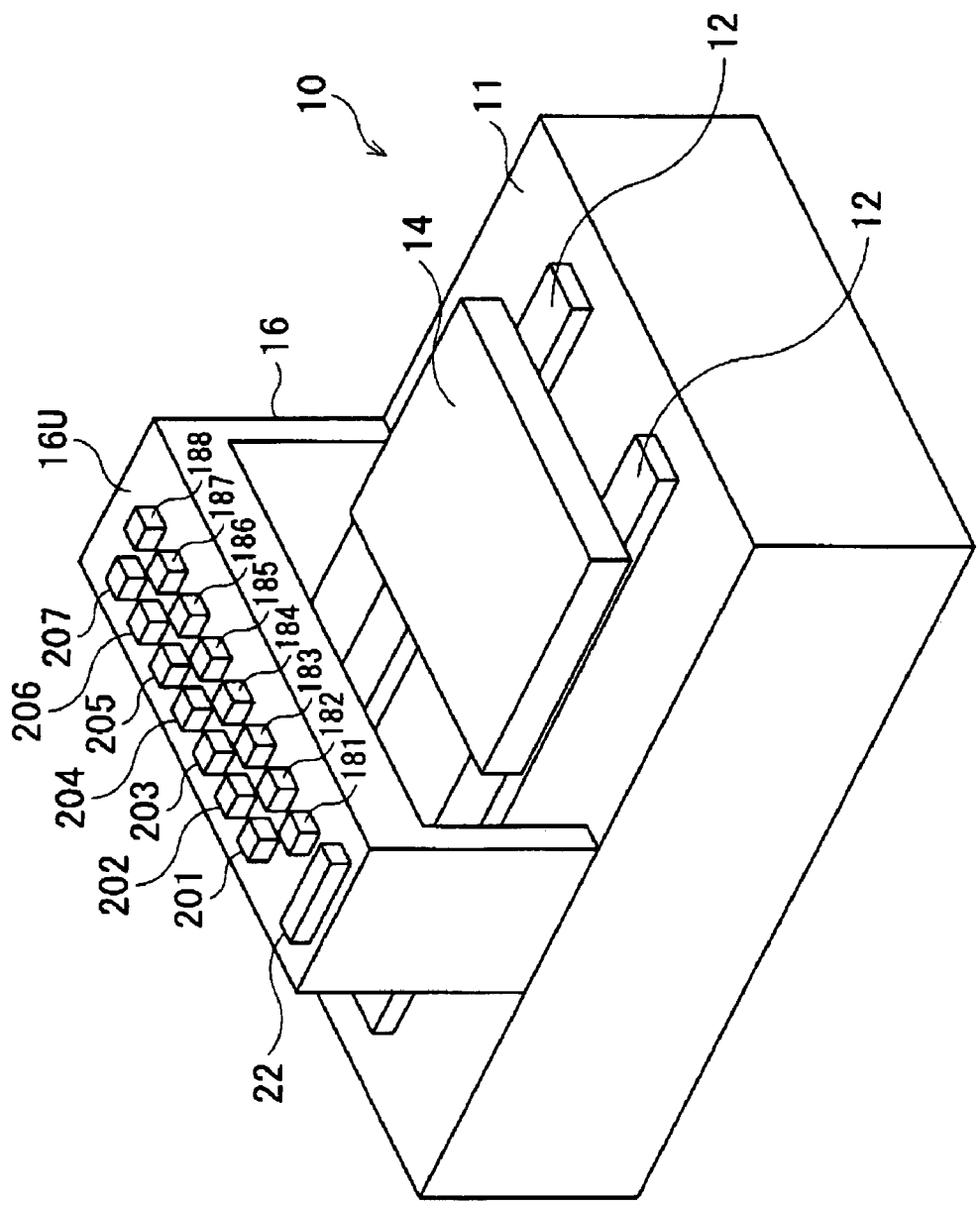
FIG. 1 is a perspective view of a multi-exposure drawing apparatus of an embodiment of the present invention.

Hereinafter, the preferred embodiment of the present invention is described with reference to the attached drawings. FIG. 1 is a perspective view of a multi-exposure drawing apparatus of an embodiment of the present invention.

A multi-exposure drawing apparatus 10 is designed to draw circuit patterns directly on a photo-resist layer formed on a substrate, and a digital micro mirror device (DMD) is used as an exposure unit. A multi-exposure drawing apparatus 10 comprises a base structure 11. On the base structure 11, a pair of guide rails 12 is laid to support a drawing table 14. The drawing table 14 is moved along the guide rails 12 by a driving mechanism, such as a stepping motor (not shown). While exposing, the drawing table 14 moves at a uniform velocity. A workpiece (not shown here) including a photo-resist layer is fixed on the drawing table 14 using suitable clamps (not shown).

The multi-exposure drawing apparatus 10 further comprises a bridge-like structure 16 straddling the guide rails 12. On the upper surface 16U of the bridge-like structure 16, exposure units are arranged in two lines in a perpendicular direction to the moving direction of the drawing table 14. In the first line, exposure units 181-188 are arranged, and in the second, exposure units 201-207 are arranged. Each of the exposure units 181-188 and 201-207, comprises a DMD unit having a plurality of micro-mirror elements arranged in a matrix manner. In this embodiment, a line-alignment of 1024 micro-mirror elements runs along the moving direction of the drawing table 14, a line-alignment of 1280 micro-mirror elements runs in a perpendicular direction to the moving direction of the drawing table 14.

On the upper surface 16U of the bridge-like structure 16, a light source device 22 having plural LEDs is provided. Light emitted by the LEDs is converged and led to each exposure unit via bundles of optical fiber cable (not shown) connecting the light source device 22 and exposure units. Micro mirrors are rotatable between a position in which a mirror reflects light toward a drawing surface of a substrate set on the drawing table 14 moving slowly, via reflecting mirrors (a "reflecting position"), and another position in which a mirror does not reflect light toward a substrate (a "non-reflecting position") These positions can be changed selectively and a suitable position is selected in each exposure. The exposure zone of each micro mirror on a substrate, can be changed by setting an optional expansion rate of the reflecting surface size for the exposure zone. In this embodiment, the rate is "1", therefore, exposure zone and reflecting surface size are the same.

Figure 2:
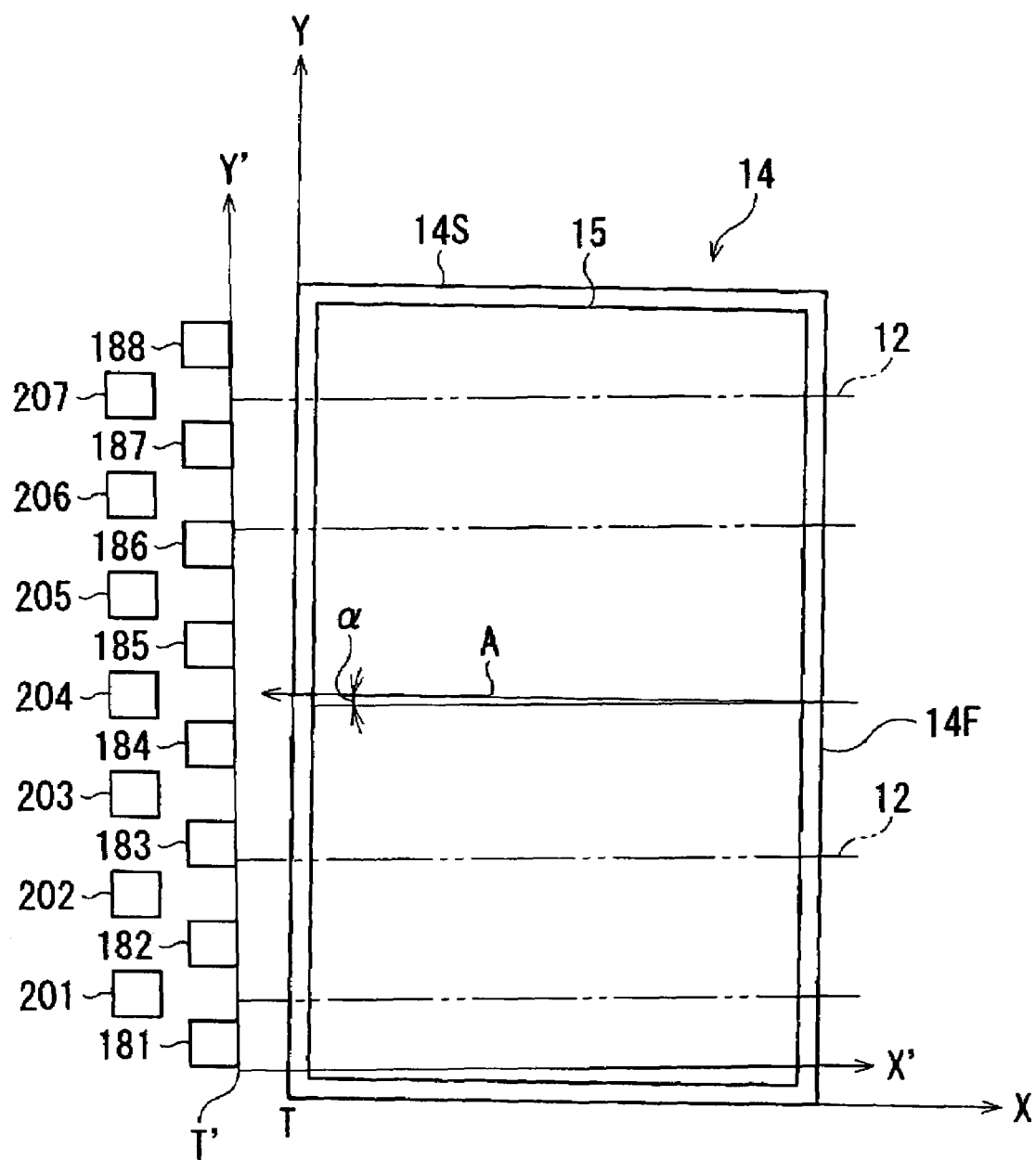
FIG. 2 is a plan view of a drawing table showing its moving direction and setting direction.

FIG. 2 is a plan view showing a moving direction and a setting direction of the drawing table 14.

The guide rails 12 run in a perpendicular direction to the arrays of the exposure units 181-188 and the exposure units 201-207. However, the drawing table 14 is set so that its outline 14S is not parallel to the guide rails 12, rather it is set in a parallel to arrow A. The drawing table 14 is inclined of angle a to the guide rails 12. Therefore, the drawing table 14 and the substrate 15 are moving along the guide rails 12, in a perpendicular direction to the arrays of the exposure units 181-188 and 201-207, however, their moving directions are inclined by the angle α to the outline 14S. Here, the drawing-coordinate-system is defined as having an axis parallel to the outline 14S and another axis parallel to the outline 14F which is perpendicular to the outline 14S, and the origin T that is the crossing point of the outline 14S and 14F. And the X-axis is defined as being parallel to the outline 14S, and the Y-axis is parallel to the outline 14F.

In addition to that, an exposing-coordinate-system is also defined as having its X'-axis parallel to the guide rails 12, and its Y'-axis parallel to the arrays of the exposure units 181-188 and 201-207. The origin T' of the exposing-coordinate-system is defined as the end point of the exposure units 181, which is the endmost exposure unit of all the exposure units. Micro-mirror elements are arranged in a matrix manner of the exposing-coordinate-system.

The angle α is set to make the exposure area of the micro mirrors shift gradually in Y'-axis direction, and is actually a very small amount, although exaggerated in FIG. 2. The exposure area of the micro mirrors also shifts in the X'-axis direction gradually, because the substrate 15 moves along X-axis.

Figure 3:
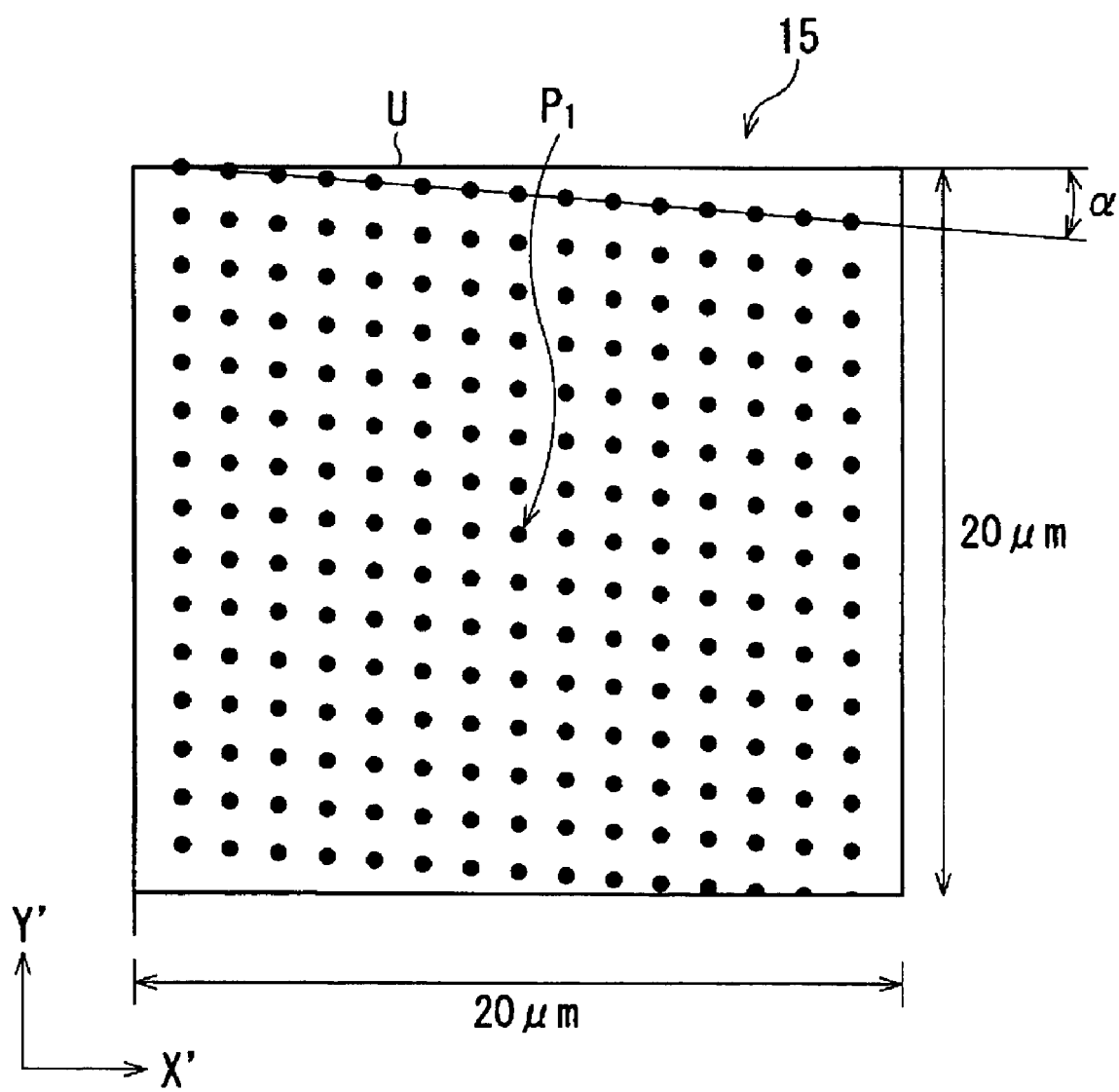
FIG. 3 is a conceptual view of a single exposure zone.

FIG. 3 is a conceptual view of a single exposure zone U that has received light reflected by one micro mirror one time in a multi-exposure operation.

A single exposure zone U is defined as a zone on the substrate 15 having received light reflected by one micro mirror, one time. A single exposure zone U has the same shape as a reflecting surface of a micro mirror, and it is a 20 µm square area in this embodiment. A point $P_1$ is the center point of the single exposure zone U. In the multi-exposure operation, many of the micro mirrors arranged in a matrix manner of the exposing-coordinate-system, reflect light towards the substrate 15. While the substrate 15 is slowly moving to the negative direction of the X'-axis at a uniform velocity, micro mirrors keep reflecting light, therefore, exposure is repeated while gradually shifting the exposure point on the substrate 15. This means, all of the area of the single exposure zone U is exposed at the same time, only one time. However, before and after the single exposure zone U has been exposed, parts of the single exposure zone U having centers indicated by the points other than $P_1$ in FIG. 3, are exposed in a multi-exposure operation. In FIG. 3, points other than the center point $P_1$, show the centers of other exposure zones which exposes a part of the single exposure zone U.

As mentioned above, in multi-exposure drawing, each single exposure zone U corresponding to a pixel, is exposed many times while the exposure zone is shifted, therefore, multi-exposure drawing has high resolution and the outlines of the drawn figures are smooth. On the other hand, in ordinary drawing, the resolution is limited by the number of pixels in the exposure unit. In addition to this, in the multi-exposure drawing, the resolution can be improved without increasing the amount of data, because the drawing can be carried out by increasing the number of times part of each single exposure zone U is exposed. However, the amount of data should be increased in ordinary drawing for improving resolution. This means that the data-conversion load and data-transmittance load are reduced in the multi-exposure drawing.

Figure 4:
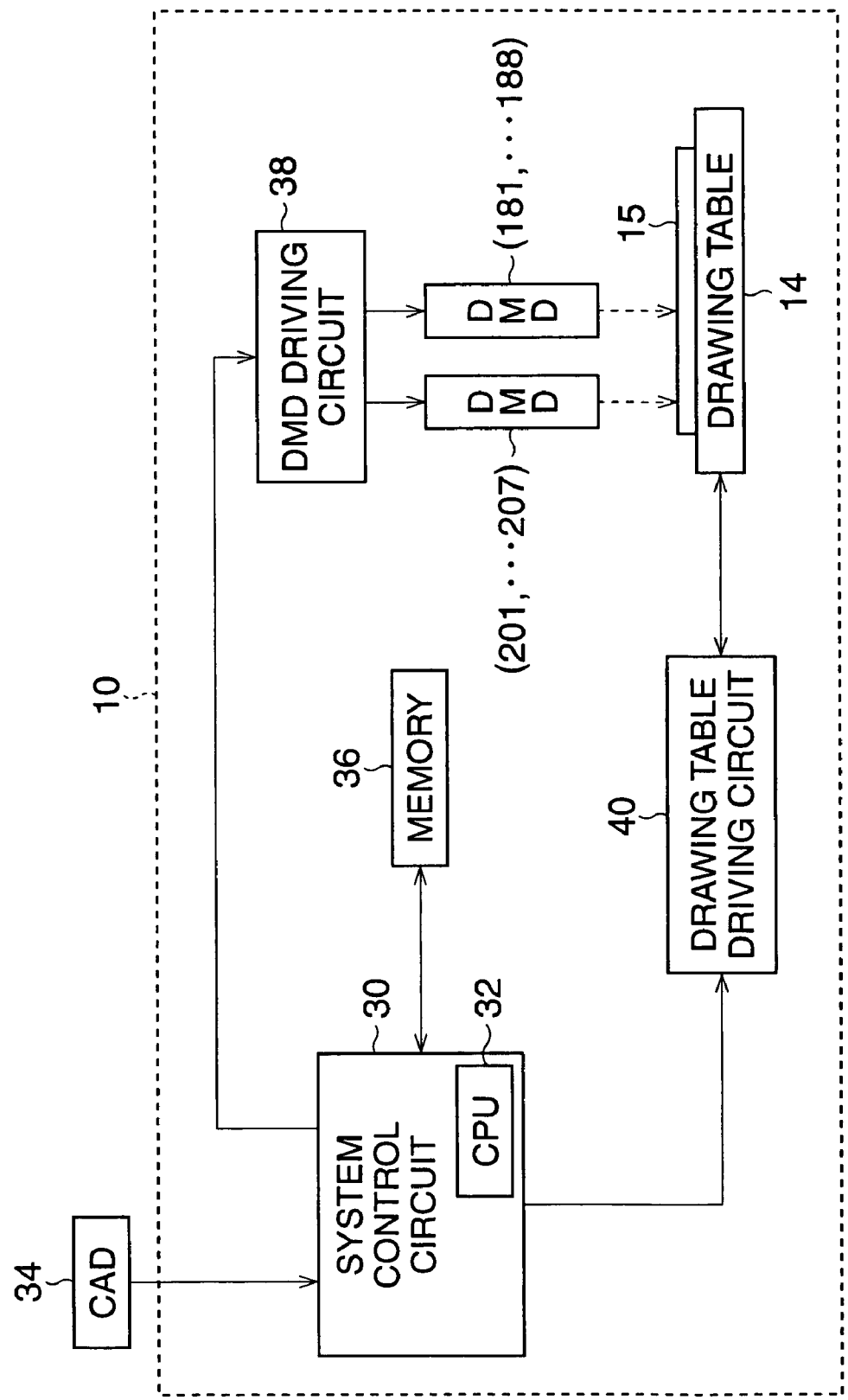
FIG. 4 is a block diagram of a multi-exposure drawing apparatus.

FIG. 4 is a block diagram of a multi-exposure drawing apparatus.

In a multi-exposure drawing apparatus 10, a system control circuit 30 for totally controlling the drawing apparatus, is provided. The system control circuit 30 is connected to a CAD 34 of a workstation, and data for a circuit pattern prepared in the CAD 34 is transmitted (a transmitting step). The circuit pattern data is memorized in a memory 36, read for the drawings, and transmitted to a DMD driving circuit 38 as drawing data after being suitably processed by the CPU 32 in the system control circuit 30, as mentioned below. The DMD driving circuit 38 controls the positions of a plurality of micro mirrors in the exposure units 181-188 and 201-207 during exposure, based on the drawing data. That is, each micro mirror is determined to be in the reflecting position or non-reflecting position, based on the drawing data. The micro mirrors in the reflecting position, reflect light toward the substrate 15, set on the drawing table 14 for drawing. The control of the micro mirrors, is finished in a very short time, therefore, exposure is repeated many times for a short time (a multi-exposing step).

In the multi-exposure drawing apparatus 10, a drawing table driving circuit 40 is also provided. The drawing table driving circuit 40 is connected to a sensor (not shown) for sensing the position of the drawing table 14. A signal that represents the position of the drawing table 14 is submitted to the drawing table driving circuit 40 from the sensor. In the drawing table driving circuit 40, a series of driving pulses for the driving mechanisms is generated based on the position sensing signal, and the driving mechanisms such as a stepping motor, are controlled by the driving pulse.

Figure 5:
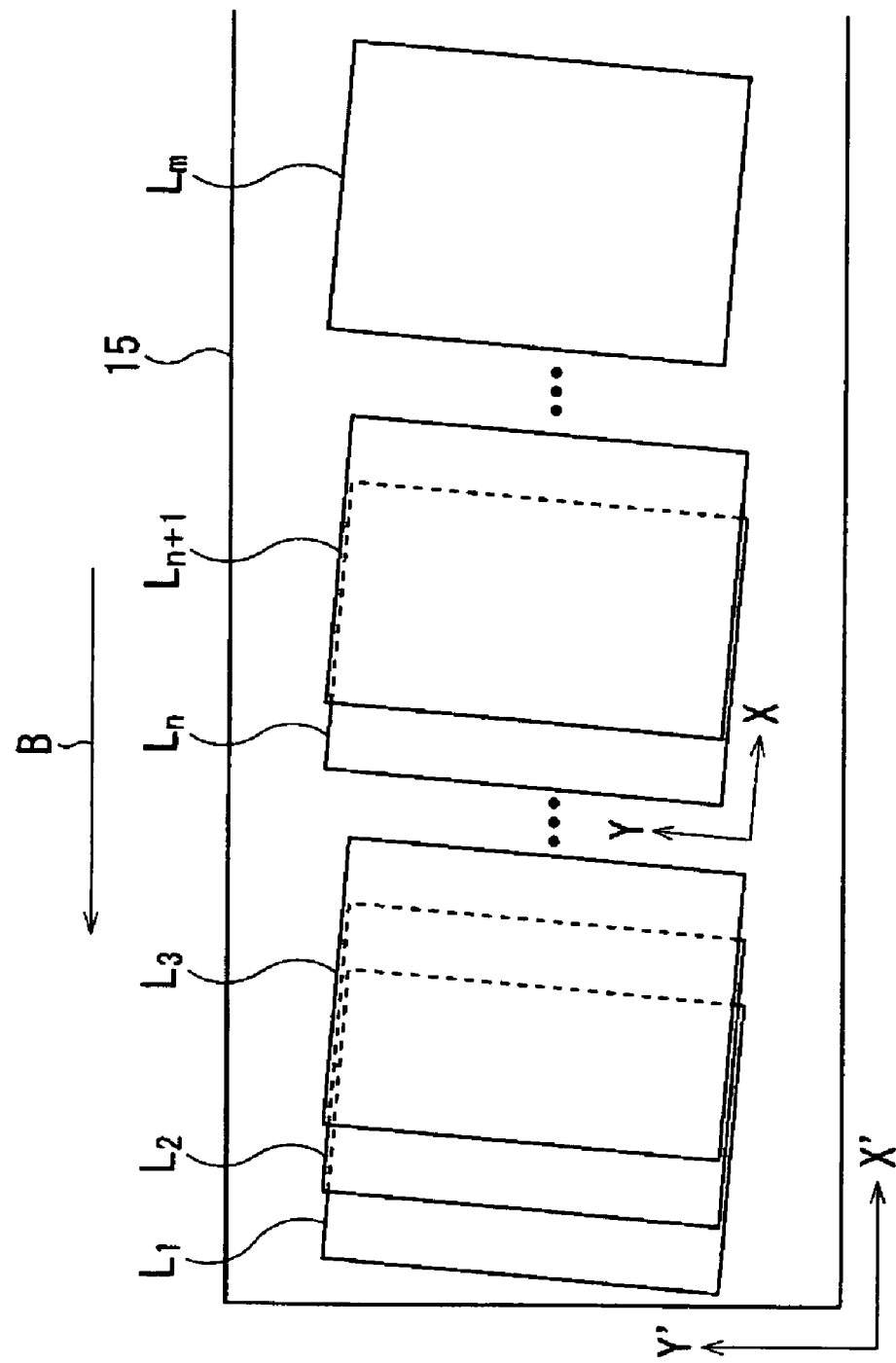
FIG. 5 is a conceptual view of the exposure areas.

FIG. 5 is a conceptual view showing the exposure area of the substrate 15. An arrow B shows a moving direction of the substrate 15.

In a multi-exposure, an exposed area which can be exposed by an action of the micro mirrors in the exposing-coordinate-system, on the substrate 15, is shifting from the first exposed area $L_1$, to the second exposed area $L_2$, then to the Nth exposed area $L_n$, and to the (N+1) th exposed area $L_{n+1}$ while multiple exposure operations are carried out. Hereinafter, how the Nth exposed area $L_n$ is exposed is explained.

Figure 6:
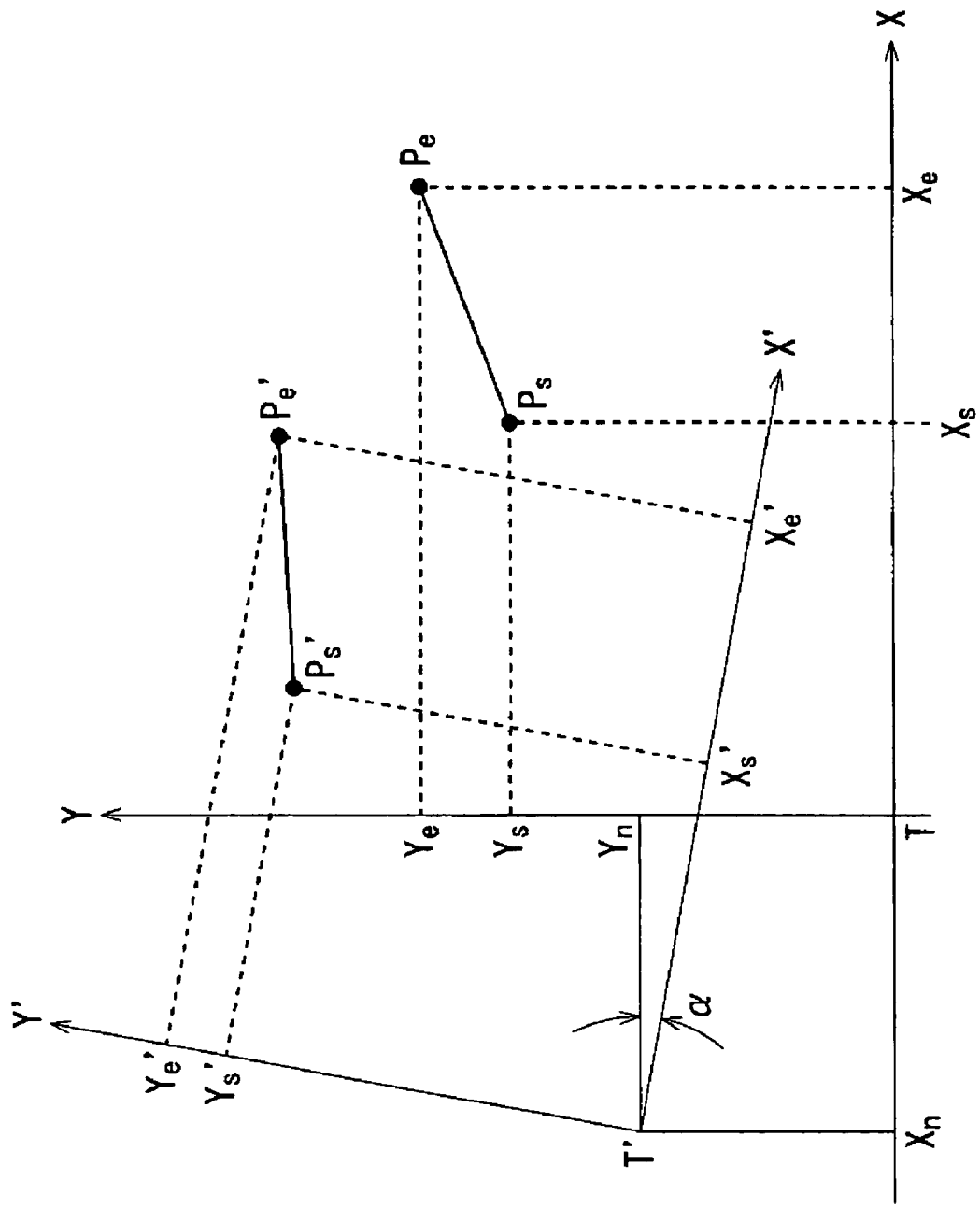
FIG. 6 is a conceptual view of the conversion of vector-graphic data of the drawing-coordinate-system to the vector-graphic data of an exposing-coordinate-system.

FIG. 6 is a conceptual view showing the conversion of vector-graphic data of the drawing-coordinate-system to the vector-graphic data of the exposing-coordinate-system.

The system control circuit 30 is connected to a CAD 34 of a workstation, and all data for circuit patterns to be drawn is transmitted from the CAD 34 to the system control circuit 30 (a transmitting step), and is memorized in the memory 36. Because the data memorized in the memory 36 is not raster-graphic data but vector-graphic data, the amount of data and data-transmittance load are smaller than in ordinary examples. The vector-graphic data of the drawing-coordinate-system is read from the memory 36, and is processed for conversion to the vector-graphic data of the exposing-coordinate-system in the CPU 32 (a first converting step). That is, a vector-graphic data $P_sP_e$ of the drawing-coordinate-system having the beginning point $P_s$ ($X_s$, $Y_s$) and the ending point $P_e$ ($X_e$, $Y_e$) is converted to a vector-graphic data $P_s'P_e'$ of the exposing-coordinate-system having the beginning point $P_s'$ ($X_s'$, $Y_s'$) and the ending point $P_s'$ ($X_e'$, $Y_e'$) as shown by formulas (1) to (4). In addition, because the origin T of the drawing-coordinate-system and the origin T' of the exposing-coordinate-system are different, the vector-graphic data conversion is conducted by modifying system values of the beginning point and ending point of each vector-graphic data, based on the difference of the origin T and T'.

$$X_s'=(X_s-X_n)\times\cos\alpha-(Y_s-Y_n)\times\sin\alpha \quad (1)$$

$$Y_s'=(X_s-X_n)\times\sin\alpha+(Y_s-Y_n)\times\cos\alpha \quad (2)$$

$$X_e'=(X_e-X_n)\times\cos\alpha-(Y_e-Y_n)\times\sin\alpha \quad (3)$$

$$Y_e'=(X_e-X_n)\times\sin\alpha+(Y_e-Y_n)\times\cos\alpha \quad (4)$$

As mentioned above, all vector-graphic data of the drawing-coordinate-system is processed as being rotated by the angle α, and is modified based on the difference of the origins, and converted to the vector-graphic data of the exposing-coordinate-system in the CPU 32. The vector-graphic data of the exposing-coordinate-system is memorized in the memory 36 with the vector-graphic data of the drawing-coordinate-system.

Figure 7:
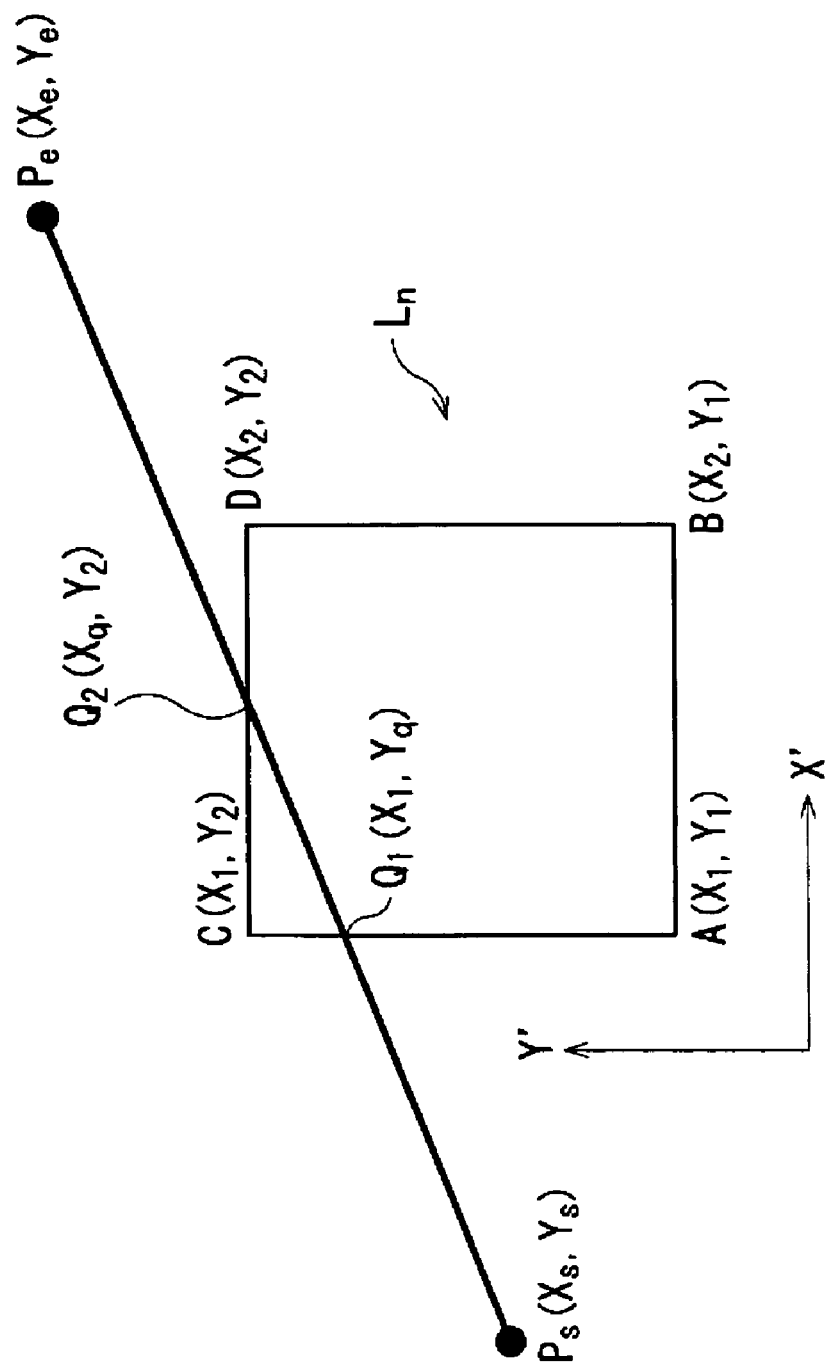
FIG. 7 is a conceptual view of the extraction of vector-graphic data in an exposed area.

FIG. 7 is a conceptual view showing the extraction of vector-graphic data in the Nth exposed area $L_n$.

To expose the Nth exposed area $L_n$, some vector-graphic data of the exposing-coordinate-system for exposing the Nth exposed area $L_n$, is extracted from the vector-graphic data of the exposing-coordinate-system for all patterns (an extracting step). For the extracting step, it is judged if at least part of the vector-graphic data of the exposing-coordinate-system is included in the Nth exposed area $L_n$ having four vertexes $A(X_1, Y_1)$, $B(X_2, Y_1)$, $C(X_1, Y_2)$, and $D(X_2, Y_2)$. How to judge if vector-graphic data of the exposing-coordinate-system is included in the Nth exposed area $L_n$ or not is explained below.

At first, in the vector-graphic data of the exposing-coordinate-system having the beginning point $P_s$ ($X_s$, $Y_s$) and the ending point $P_e$ ($X_e$, $Y_e$), the coordinate values of $X_s$ and $X_e$ are compared. When $X_s > X_e$, coordinate values of the beginning point and the ending point are exchanged, therefore, in all vector-graphic data of the exposing-coordinate-system, $X_s \leq X_e$ after this process. In this case, vector-graphic data having the coordinate system value with a beginning point $X_s$ larger than $X_2$, and having the coordinate system value with an ending point $X_s$ smaller than $X_1$ are not included in the Nth exposed area $L_n$. Therefore, to be included in the Nth exposed area $L_n$, vector-graphic data has to meet the requirement of formula (5) in terms of the X-axis.

$$(X_e-X_1)\times(X_2-X_s)\geq 0 \quad (5)$$

On the other hand, in terms of the Y-axis, the situation is different and depends on a value of the incline K of the beginning point $P_s$ ($X_s$, $Y_s$) and the ending point $P_e$ ($X_e$, $Y_e$) Of the vector-graphic data. When an incline K is positive or 0 ($0 \leq K$), vector-graphic data having the coordinate system value with a beginning point $Y_s$ larger than $Y_2$, and having the coordinate system value with an ending point $Y_e$ smaller than $Y_1$ are not included in the Nth exposed area $L_n$. On the other hand, when an incline K is negative (K<0), vector-graphic data having the coordinate system value with a beginning point $Y_s$ smaller than $Y_1$, and having the coordinate system value with an ending point $Y_e$ larger than $Y_2$ are not included in the Nth exposed area $L_n$. As mentioned above, to be included in the Nth exposed area $L_n$, vector-graphic data has to meet the requirements of formula (6) and (7) in terms of the Y-axis.

$$(Y_e-Y_1)\times(Y_2-Y_s)\geq 0 \ (0\leq K) \quad (6)$$

$$(Y_s-Y_1)\times(Y_2-Y_s)\geq 0 \ (K<0) \quad (7)$$

Further, to be partially included in the Nth exposed area $L_n$, vector-graphic data has to have a point that crosses one of the four sides of the Nth exposed area $L_n$, hereafter, referred to as a crossing point. When setting a point $Q_1$ as a crossing point of vector-graphic data $P_sP_e$ and the side AC, meeting formula (8) is required for a crossing point $Q_1$ ($X_1$, $Y_q$) to exist. In addition, when using an incline K of vector-graphic data $P_sP_e$ as a formula (9), the requirement for a crossing point $Q_1$ to exist, is presented by formula (10).

$$Y_1 \leq Y_q \leq Y_2 \tag{8}$$

$$Y_q = K(X_1 - X_s) + Y_s \tag{9}$$

$$Y_1 \leq K(X_1 - X_s) + Y_s \leq Y_2 \tag{10}$$

Also, the conditions for a crossing point of vector-graphic data $P_sP_e$ and a side BD to exist, are presented by formula (11).

$$Y_1 \leq K(X_2 - X_s) + Y_s \leq Y_2 \tag{11}$$

Also, in terms of the X-axis direction, setting a point $Q_2$ as a crossing point of vector-graphic data $P_sP_e$ and a side CD, meeting formula (12) is required for the crossing point $Q_2$ ($X_q$, $Y_2$) to exist. In addition, requirement for the existence of a crossing point of vector-graphic data $P_sP_e$ and a side AB, is presented by formula (13).

$$X_1 \leq (Y_2 - Y_s)/K + X_s \leq X_2 \tag{12}$$

$$X_1 \leq (Y_1 - Y_s)/K + X_s \leq X_2 \tag{13}$$

As mentioned above, vector-graphic data which is completely included in the the Nth exposed area $L_n$, meeting formula (5), and one of formula (6) and (7), and vector-graphic data which is partially included in the Nth exposed area $L_n$, meeting one of formula (10) to (13) are extracted in an extracting step.

Figure 8:
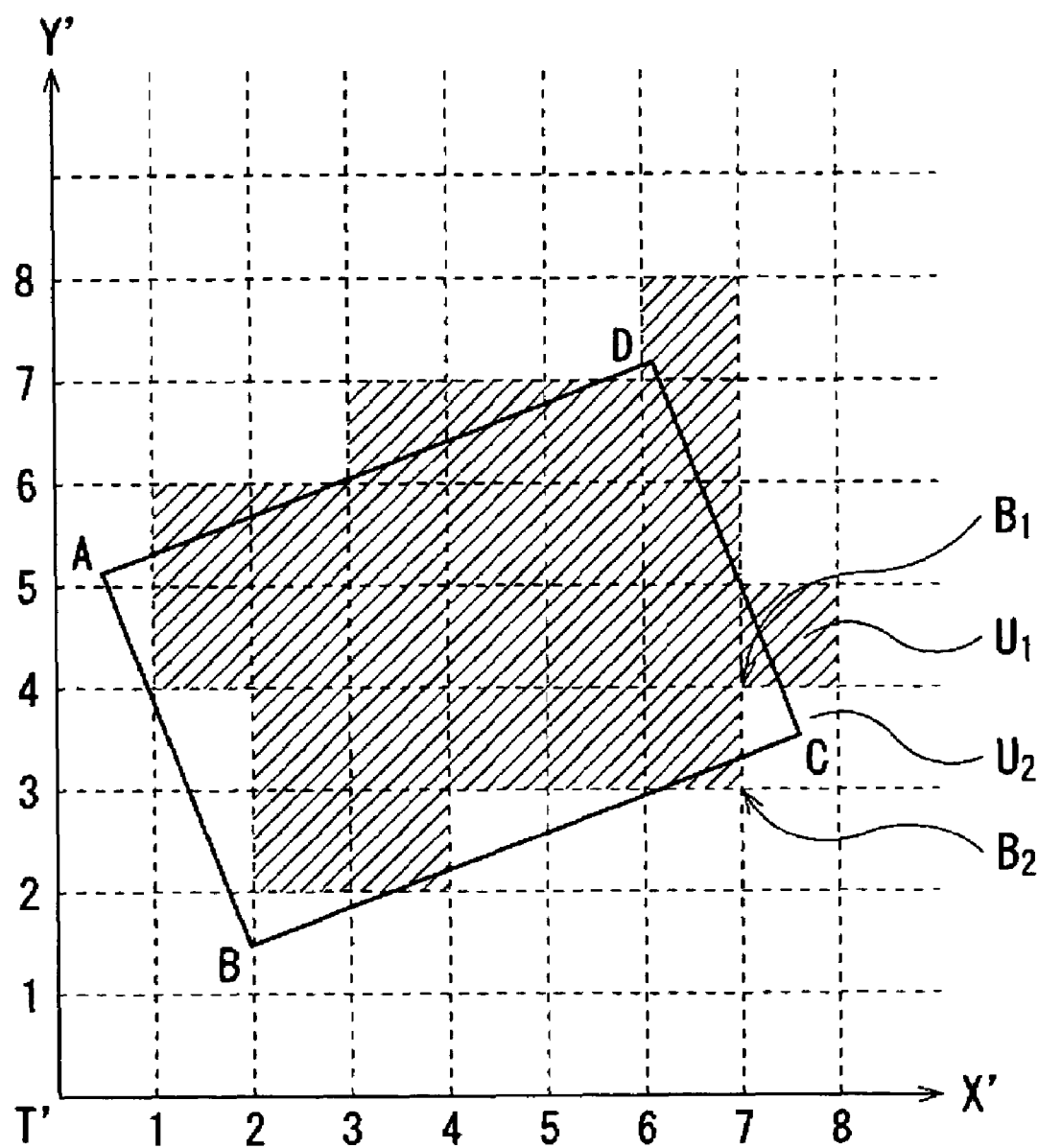
FIG. 8 is a conceptual view of the conversion of vector-graphic data of the exposing-coordinate-system to raster-graphic data.

FIG. 8 is a conceptual view showing the outline of vector-graphic data of the exposing-coordinate-system converted to raster-graphic data. In this embodiment, all figures being exposed are squares surrounded by vector data. This means, the figures being exposed are all closed figures and the insides of the figures are exposed.

Based on the extracted vector-graphic data, raster data for controlling the exposure of the Nth exposed area $L_n$ is produced (a second converting step). In the multi-exposure drawing, each exposed area (from $L_1$ to $L_m$) in the exposing-coordinate-system, is divided into some zones according to the vector-graphic data, and exposed zones which should be exposed are determined based on the Y' coordinate values. That is, a zone between the X' coordinate axis and the first vector-graphic data having the beginning point whose Y' coordinate system value is the smallest in all vector-graphic data is not exposed, and a zone between the first vector-graphic data and the second vector-graphic data having the second smallest Y' coordinate value, is exposed. In addition, a zone between the second vector-graphic data and the third vector-graphic data having the third smallest Y' coordinate system value is not exposed, and such zone setting is repeated. For this type of exposing, all extracted vector-graphic data are sorted and assigned a number according to the Y' coordinate system value of its beginning point. That is, vector-graphic data whose beginning point has the smallest Y' coordinate system value, is numbered 1. Following this, each vector-graphic data is assigned a number and one having a smaller Y' coordinate system value of its beginning point is numbered smaller. When the Y' coordinate system values of some beginning points are the same, assigned numbers are determined based on the values of the corresponding ending points. Vector-graphic data having larger Y' coordinate system values is assigned smaller number. As mentioned above, each beginning point has smaller X' coordinate system value than that of the corresponding ending point.

Vector-graphic data assigned numbers, are divided into two groups, one is odd-numbered vector-graphic data, and another is even-numbered vector-graphic data. An exposed area is divided into exposed zones and un-exposed zones according to vector-graphic data, following the above mentioned method. Therefore, a zone between one odd-numbered vector-graphic data and one even-numbered vector-graphic data having an assigned number 1 more than that of the odd-numbered vector-graphic data, is an exposed zone. And a zone between one even-numbered vector-graphic data and one odd-numbered vector-graphic data having an assigned number 1 more than that of the even-numbered vector-graphic data, is an un-exposed zone.

FIG. 8 is an example showing vector-graphic data of the exposing-coordinate-system. Vector-graphic data BC whose beginning point has the smallest Y' coordinate system value of the four vector-graphic data AB, BC, AD, and DC, is numbered 1. Vector-graphic data AD having a beginning point A, is numbered 2, vector-graphic data AB having the same beginning point as vector-graphic data AD, but where the Y' coordinate system value of its ending point is smaller that of vector-graphic data AD, is numbered 3. Finally, vector-graphic data DC is numbered 4 because the Y' coordinate system value of its beginning point is the largest. By numbering as explained above, a zone surrounded by these four vector-graphic data is judged as an exposed zone, following above mentioned method.

Raster-graphic data for controlling the exposure, defines whether each micro mirror is put in the reflecting position or non-reflecting position, that is, it defines whether a single exposure zone U should be exposed or not. Therefore, in the example of FIG. 8, an exposed zone surrounded by four vector-graphic data, should be approximately converted to a grid system, as an actual exposed zone, comprising single exposure zones U, each having a length which is a division of the exposing-coordinate-system. Therefore, if the bottom left vertex of each single exposure zone is set as a standard point, single exposure zones U whose standard points are included in the zone surrounded by four vector-graphic data, are determined to be included in the actual exposed zone. For example, a first single exposure zone $U_1$ whose standard point $B_1$ is included in the surrounded zone in FIG. 8, is determined to be included in the actual exposed zones, and a second single exposure zone $U_2$ whose standard point $B_2$ is out of the surrounded zone, is determined not to be included in the actual exposed zones. The standard point can be defined as any point of each single exposure zone U, such as its center point.

As mentioned above, the actual exposed zone is determined, and then raster-graphic data is produced (a second converting step). In FIG. 9 which is a conceptual view showing raster-graphic data in this example, single exposure zones numbered "1" are included in the actual exposed zone because their standard points are included in the surrounded zone (see FIG. 8). On the other hand, single exposure zones numbered "0" are out of the actual exposed zone. This configured raster-graphic data is transmitted to a DMD driving circuit 38 from the system control circuit 30. And then, each micro mirror in the exposure units 181-188 and 201-207 is driven to be in the reflecting position or the non-reflecting position, and multi-exposure is conducted (a multi-exposing step).

The extraction of the vector-graphic data of the exposing-coordinate-system (an extracting step), conversion of the vector-graphic data of the exposing-coordinate-system to raster-graphic data (a second conversion step), and multi-exposure based on the raster-graphic data (a multi-exposing step) is repeated a plurality of times. In this embodiment, for each exposed area, from the first exposed area $L_1$, to the Nth exposed area $L_n$, then to the (N+1) th exposed area $L_{n+1}$ and finally to the last exposed area $L_m$ (see FIG. 5), "an extracting step", "a second conversion step", and "a multi-exposing step" are repeated. Therefore, each step is repeated totally "m" times for exposing all exposed area, $L_1$ to $L_m$.

Determining if each single exposure zone is an exposed zone or not according to the vector-graphic data, can be conducted based on information already contained in the vector-graphic data of the drawing-coordinate-system. That is, an action corresponding to the sorting of the vector-graphic data of the exposing-coordinate-system, can be conducted for the vector-graphic data of the exposing-coordinate-system in the CAD 34. Further, each vector-graphic data can have a flag and so forth representing a zone, expanding from each vector-graphic data in the Y'-axis positive direction, to indicate whether the zone is an exposed zone or not, with coordinate system values of each beginning and ending point. For example, the vector-graphic data AB in FIG. 8, can be provided with a flag "1" representing that a zone expanding from the vector-graphic data AB in the Y'-axis positive direction is an exposed zone, and the vector-graphic data AD can be provided with a flag "0" meaning a zone expanding from the vector-graphic data AD in the Y'-axis positive direction, is an un-exposed zone.

The drawing table 14 does not need to move at a uniform velocity, and it can stop for each multi-exposure.

The number of the exposure units and the micro mirrors, the shape and size of the micro mirrors, and so on are not limited to those of the embodiment. And optical modulation elements in the exposure unit can be LCD and so on.

As mentioned above, the drawing method according to the current invention enables high-resolution drawing without having a heavy data-conversion load and data-transmittance load, by using a multi-exposure drawing apparatus. Further, the invention provides a multi-exposure drawing apparatus in which the aforesaid multi-exposure drawing method is executed.

Finally, it will be understood by those skilled in the art that the foregoing description is of preferred embodiments of the method and apparatus, and that various changes and modifications may be made to the present invention without departing from the spirit and scope thereof.

The present disclosure relates to subject matters contained in Japanese Patent Application No. 2003-313934 (filed on Sep. 5, 2003) which is expressly incorporated herein, by reference, in its entirety.

The invention claimed is:

1. A drawing method for drawing a pattern on a drawing surface comprising:
a first converting step in which first vector-graphic data of a drawing-coordinate-system, that represents all information on said pattern, is converted in an exposure drawing apparatus having a plurality of optical modulation elements, to second vector-graphic data of an exposing-coordinate-system that conforms to said exposure drawing apparatus;
a second converting step in which said second vector-graphic data is converted to raster-graphic data of the exposing-coordinate-system, to control the exposure by said optical modulation elements; and
a multi-exposing step in which said drawing surface is multi-exposed for drawing said pattern, based on said raster-graphic data,
wherein, in said second converting step, said second vector-graphic data is put in order and assigned a number according to the coordinate system values of each of said second vector-graphic data,
all of said second vector-graphic data is divided into odd-numbered vector-graphic data and even-numbered vector-graphic data based on each said number of said second vector-graphic data, and
said second vector-graphic data is converted to said raster-graphic data, by dividing an exposing area which is an exposable area in the exposing-coordinate-system, into exposed zones and un-exposed zones based on said odd-numbered vector-graphic data and said even-numbered vector-graphic data.

2. The drawing method of claim 1, further comprising:
an extracting step in which part of said second vector-graphic data is extracted, between said first converting step and said second converting step;
wherein said second converting step, in which said part of said second vector-graphic data is converted to said raster-graphic data, said multi-exposing step, and said extracting step are repeated.

3. The drawing method of claim 1, wherein said first vector-graphic data contains information to determine a method for converting said second vector-graphic data to said raster-graphic data.

4. The drawing method of claim 1, wherein, in said second converting step, smaller numbers are assigned to said second vector-graphic data having smaller coordinate system values, coordinate axes of the exposing-coordinate-system are included in said even-numbered vector-graphic data, and a zone that is between one even-numbered vector-graphic data and one odd-numbered vector-graphic data having an assigned number 1 more than that of said even-numbered vector-graphic data, is set as said un-exposed zone, and a zone that is between one odd-numbered vector-graphic data and one even-numbered vector-graphic data having an assigned number 1 more than that of said odd-numbered vector-graphic data, is set as said exposed zone.

5. The drawing method of claim 1, further comprising:
a transmitting step in which said information on said pattern to be drawn on said drawing surface, represented by said first vector-graphic data, is transmitted to said exposure drawing apparatus.

6. A multi-exposure drawing apparatus for drawing a pattern on a drawing surface comprising:
an exposure unit that includes a plurality of optical modulation elements,
a first converter configured to convert first vector-graphic data of a drawing-coordinate-system, that represents all information on said pattern, to second vector-graphic data of an exposing-coordinate-system,
a second converter configured to convert said second vector-graphic data to raster-graphic data of the exposing-coordinate-system, and
a multi-exposing system that operates said plurality of optical modulation elements to draw said pattern based on said raster-graphic data,
wherein said second converter puts said second vector-graphic data in order and assigns a number according to the coordinate system values of each of said second vector-graphic data,
divides all of said second vector-graphic data into odd-numbered vector-graphic data and even-numbered vector-graphic data based on each said number of said second vector-graphic data, and converts said second vector-graphic data to said raster-graphic data, by dividing an exposing area which is an exposable area in the exposing-coordinate-system, into exposed zones and un-exposed zones based on said odd-numbered vector-graphic data and said even-numbered vector-graphic data.

7. The multi-exposure drawing apparatus of claim 6, further comprising:

an extractor configured to extract part of said second vector-graphic data, wherein said second converter converts said part of said second vector-graphic data to said raster-graphic data, said modulation system operates said exposure unit based on said raster-graphic data, and said extraction, said second conversion, and said modulation are repeated.

8. The multi-exposure drawing apparatus of claim 6, wherein, said optical modulation elements are arranged in a two-dimensional arrangement.

9. The multi-exposure drawing apparatus of claim 6, further comprising:

a receiver configured to receive said information on said pattern to be drawn on a drawing surface, as said first vector-graphic data.

10. The multi-exposure drawing apparatus of claim 6, wherein said second converter assigns smaller numbers to said second vector-graphic data having smaller coordinate system values, includes coordinate axes of the exposing-coordinate-system in said even-numbered vector-graphic data, sets as said un-exposed zone a zone that is between one even-numbered vector-graphic data and one odd-numbered vector-graphic data having an assigned number 1 more than that of said even-numbered vector-graphic data, and sets as said exposed zone a zone that is between one odd-numbered vector-graphic data and one even-numbered vector-graphic data having an assigned number 1 more than that of said odd-numbered vector-graphic data.

* * * * *